United States Patent
Horn

(10) Patent No.: US 9,223,303 B2
(45) Date of Patent: Dec. 29, 2015

(54) METHOD FOR PROVIDING SAFETY FUNCTIONS

(75) Inventor: Steffen Horn, Blomberg (DE)

(73) Assignee: Phoenix Contact GmbH & Co. KG (DE)

( * ) Notice: Subject to any disclaimer, the term of this patent is extended or adjusted under 35 U.S.C. 154(b) by 717 days.

(21) Appl. No.: 13/394,515

(22) PCT Filed: Sep. 21, 2010

(86) PCT No.: PCT/EP2010/005767
§ 371 (c)(1),
(2), (4) Date: Apr. 17, 2012

(87) PCT Pub. No.: WO2011/035881
PCT Pub. Date: Mar. 31, 2011

(65) Prior Publication Data
US 2012/0197417 A1   Aug. 2, 2012

(30) Foreign Application Priority Data

Sep. 23, 2009 (DE) .......................... 10 2009 042 355
Aug. 2, 2010 (DE) .......................... 10 2010 033 039

(51) Int. Cl.
*G05B 9/02* (2006.01)
*G05B 11/01* (2006.01)
*G05B 19/042* (2006.01)

(52) U.S. Cl.
CPC .. *G05B 19/0426* (2013.01); *G05B 2219/23214* (2013.01); *G05B 2219/25157* (2013.01); *G05B 2219/25314* (2013.01)

(58) Field of Classification Search
CPC .................................................. G05B 19/0426
USPC ......................................................... 700/81
See application file for complete search history.

(56) References Cited

U.S. PATENT DOCUMENTS

| 5,530,643 | A  | * | 6/1996  | Hodorowski ............... 700/86 |
| 5,845,095 | A  | * | 12/1998 | Reed et al. ................ 710/104 |
| 6,021,357 | A  |   | 2/2000  | Peterson |
| 2004/0107237 | A1 | * | 6/2004  | Kashiwada ............... 709/200 |
| 2004/0148130 | A1 | * | 7/2004  | Scott et al. ............... 702/183 |
| 2004/0230323 | A1 | * | 11/2004 | Glanzer et al. ............ 700/18 |
| 2010/0004761 | A1 | * | 1/2010  | Flanders et al. ........... 700/28 |

FOREIGN PATENT DOCUMENTS

| CN | 1802612 A      | 7/2006  |
| EP | 0718727 A2     | 6/1996  |
| WO | 2004095716 A2  | 11/2004 |

OTHER PUBLICATIONS

Related Chinese Patent Application No. CN 2010 800 42404.7 Office Action, Nov. 29, 2013, Publisher: CIPO, Published in: CN.
Hageman, Elodie, PCT Application No. PCT/EP2010/005767 International Search Report Jan. 3, 2011, Publisher: PCT, Published in: PCT.
Related Chinese Patent Application No. 2010 0042404.7, Office Action, Aug. 19, 2014, Publisher: SIPO, Published in: CN.

* cited by examiner

*Primary Examiner* — Mohammad Ali
*Assistant Examiner* — Yuhui R Pan
(74) *Attorney, Agent, or Firm* — Kaplan Breyer Schwarz & Ottesen, LLP

(57) ABSTRACT

The present invention relates to a method for safely providing safety functions for safety devices of an automation system. For this purpose, modular safety components are introduced, comprising a logic module (A, B, . . . , X), an address-dependent parameter module (1, 2, . . . , n), and failsafe information. The modules are stored separately with recovery information. After turning on a safety device in an automation system, a safety component created for a specific device can be restored and transmitted to the safety device, wherein the accuracy of the safety component is checked in the safety device.

13 Claims, 2 Drawing Sheets

METHOD FOR PROVIDING SAFETY FUNCTIONS

FIELD OF THE INVENTION

The present invention relates to a method for safely providing safety functions for safety devices of an automation system, and an automation system for carrying out the method.

BACKGROUND OF THE INVENTION

In the field of automation technology it is often required to implement safety functions for the protection of humans, machines and the environment such as turning off a machine after opening a guard door or actuating an emergency stop switch. For this, conventional safety concepts are increasingly replaced by safety functions embedded in failsafe automation systems. These systems comprise failsafe subscribers which are decentrally connected to the network of an automation bus system, i.e., to a fieldbus system, wherein usually, the actual safety functions as well as the error-detecting and the error-controlling measures are implemented in the subscribers. According to the current state of the art, these measures have to comply with the mechanisms specified in the standards IEC 61508, ISO 13849, etc.

In current automated installations, depending on the degree of automation and the dimensions of the installations, communication systems are used which connect decentralized input/output devices (I/O devices) and controllers. The I/O devices and controllers can be standard subscribers and also subscribers with safety functions. For transporting safety-related data via common communication systems it is known to support the network through safe network protocols. Controlling standard functions and safety functions can be implemented via a common network by a centralized structure with a standard and safety controller and also by decentralized control and safety logics which are distributed in the network of a communication or fieldbus system.

One requirement for the I/O devices and controllers to be used as subscribers of a failsafe communication system for automation systems is that they are independent of a respective network and the respective controller so that the safety systems, i.e., the safety subscribers, can still be used when changing a standard controller and/or a network. For such a re-utilization possibility it is necessary to provide a handling of such failsafe automation systems that is as simple as possible. For this purpose, the safety functions of an automation system or an installation are provided separately from the standard functions and are divided into small, manageable, locally limited modules. This modularization of the safety functions and their separation from the standard functions allows a simple verification of the individual modules and therefore complies with the requirements of actual safety standards. In addition, this corresponds to the way of thinking of a person skilled in the art familiarized with the field of safety technology.

Complete installations or machines are more and more frequently composed of a multiplicity of individual and sometimes independently operating system or machine components which are assembled and commissioned at the end customer only after delivery. In the case of these installations, which are modularly built from individual components, the entire safety functions, i.e., the system-wide safety functions have to be validated prior to the commissioning and after a conversion or a flexible expansion in order to ensure the correctness of the safety functions.

According to the known prior art, the final adaptations of the safety-relevant parameters and the programming in the safe subscribers as well as the validation process for a correct safety function have to be carried out directly in the commissioning phase. Today's decentralized and modular safety functions require the use of special failsafe programming tools by means of which the safety programs and safety parameters can be uploaded directly to safety controllers or to the safety I/O devices. In the case of modifications, adaptations or expansions of an existing automation system, usually, another on-site deployment of the special failsafe programming tools is necessary by means of which uploading and validating is carried out again. The typical approaches of the prior art for validating the safety functions during commissioning require a time-consuming deployment of personnel, namely personnel which is qualified for the use of the safety-relevant programming tools, and are therefore cost-intensive.

SUMMARY OF THE INVENTION

It is an object of the invention to provide a method that is flexible and optimized with respect to the prior art, by means of which the safety functions in the form of safety components are designed and validated in a computerized manner for a number of uniquely addressable safety devices in a network of an automation system, and are loaded into the safety devices.

In order to achieve this object, the present invention proposes to create modular safety components for a number of safety devices of an automation system, wherein a modular safety component contains a combination of an address-independent logic module, an address-dependent parameter module, and failsafe information calculated via both modules.

To be understood as a safety device within the context of the invention are, for example, the I/O devices and controllers by means of which safety-relevant functions in an automation system are controlled or implemented. In particular, the number of devices of a system can be interconnected as subscribers in a communication network and can safely exchange safety-related data between each other.

In a first method step, a number of safety components are created. Creating the safety components is carried out with a failsafe programming tool, wherein the logic functions are designed in a computerized manner and are stored in the logic functions. These logic modules can be used for different devices with identical safety functions in the automation system and are therefore address-independent. In contrast, the parameter modules are always generated for a specific safety component of a particular and uniquely addressable safety device and therefore contain address-dependent data. The latter can be source and destination addresses of safety communication relations which a safety device needs for the communication in the network. The failsafe information includes redundant information, e.g. checksums, which has been calculated via logic and parameter modules, and further measures according to the mentioned standards. With the modular safety components, the method of the invention introduces a clear separation between the address-dependent parameters and the address-independent logic which can be used multiple times in an entire system.

In a second method step, the generated safety components are stored, wherein the modules and the failsafe information are stored individually. For each generated safety component, recovery information is stored.

Storing the logic and parameter modules and the failsafe information takes place in any storage which principally does not have to manage safety-related measures. Data for recovery of the safety components stored in modules are likewise stored with the failsafe programming tool. The recovery information can principally also be output as system configuration in the form of tables.

In a third method step, after connecting a safety device to the automation system, the safety component created for the device is recovered by means of the recovery information from the associated logic and parameter modules and the associated failsafe information and is transmitted to the safety device.

In comparison to the prior art, loading the safety components in particular does not take place directly after they are created with the failsafe programming tool, but only during the commissioning of the automation system, the safety functions of which are available decentralized in the network. An essential advantage of the method according to the invention is that uploading the safety components to the safety devices together with uploading the components for the standard I/O devices and controllers can be carried out immediately with commissioning an automation system. Uploading all the functions can be carried out uniformly with a computerized programming tool which does not need to support any safety-related measures.

Recovering the respective safety components takes in particular place in that the computerized programming tool processes the recovery information and the stored modules and failsafe information are composed automatically.

Alternatively, composing the modules can also be carried out manually with the non-failsafe programming tool based on the tabular system configuration.

In a preferred embodiment of the method, the transmission of a safety component is requested by the respective particular safety device.

It is therefore possible that, e.g., a non-parameterized safety device can be connected as replacement device to the network even after commissioning the automation system so that without manual involvement, a particular safety component can be reloaded by the standard controller.

In a fourth and last method step, the accuracy of the transmitted safety component is checked in the safety device by means of the associated failsafe information.

The safety devices can independently perform different checks, for example for plausibility, consistency, valid combination or version, based on the source and destination addresses in the parameter module, and detect all errors which can occur during storing and combining and also during loading the safety components into the respective device. When detecting an error, which principally can be any kind of corrupted or mixed up data, the respective safety device performs a safety-related reaction, for example by assuming a safe state. In particular, invalid combinations of logic and parameter modules can be reliably detected during the recovery of the safety components. Thereby it is ensured that only combinations validated with the failsafe programming tool are accepted by the safety devices.

As a storage in which the logic and parameter modules as well as the safety information can be stored, in particular, a standard storage medium can be used which does not have to provide any safety-related measures during storing.

Such a non-safe storage is preferably provided by a non-safe standard controller of the respective automation system. This enables an automatic download of safety components from a central controller to the safety devices so that the devices are not dependent on a remanent internal storage. Another advantage is the update and upgrade capability in the case of a potential expansion of the automation system.

In a further particularly preferred embodiment of the method according to the invention, when storing a second and any further safety component, the associated logic modules are stored by the failsafe programming tool only if previously no identical logic modules were stored.

An essential advantage of the method according to the invention is that the stored logic modules can be used multiple times for different modular safety components and therefore have to be stored only once in the non-safe storage. In particular in the case of small controllers, valuable and limited storage space can be saved in this manner.

BRIEF DESCRIPTION OF THE DRAWINGS

The invention is explained in more detail hereinafter by means of an exemplary embodiment and with reference to the figures. In the figures.

DETAILED DESCRIPTION

Figure 1:
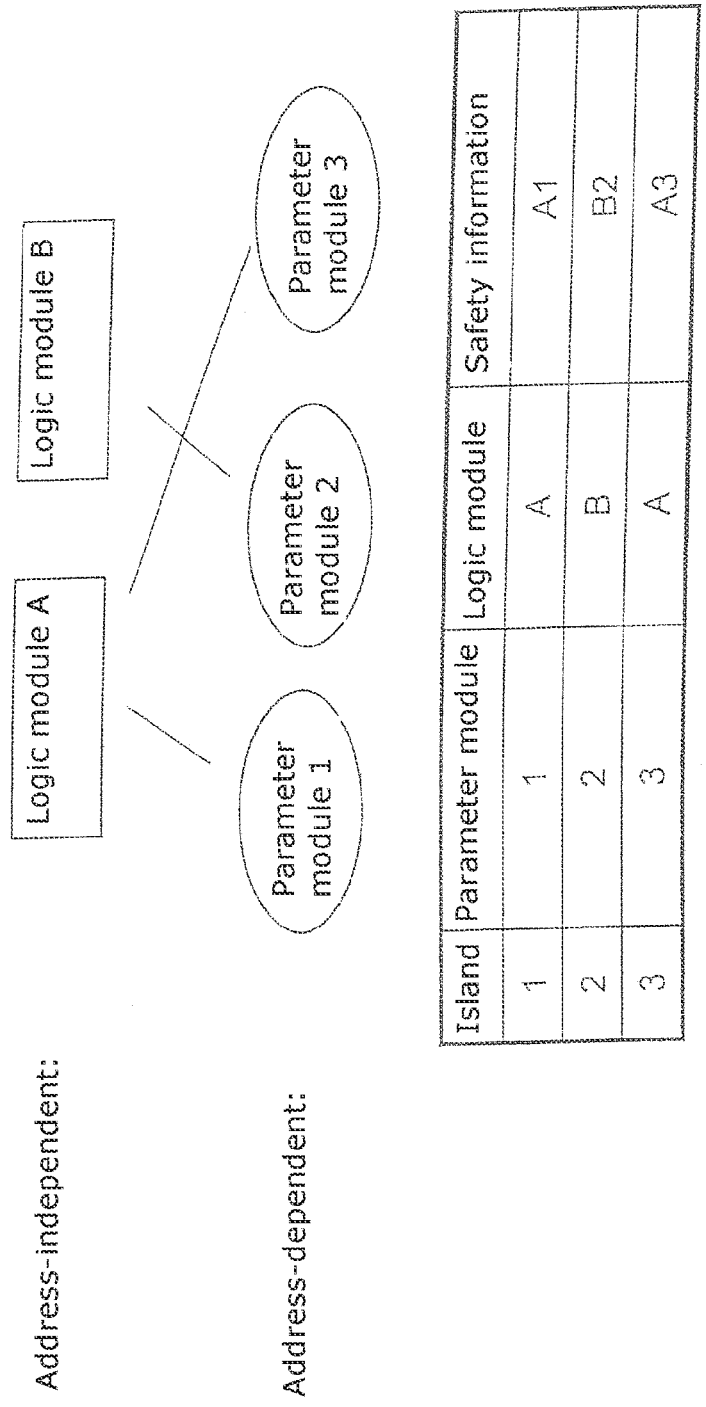
FIG. 1 shows the separation of the modular safety components of a decentralized safety control in address-independent logic modules and address-dependent I/O parameter modules.

FIG. 1 illustrates the principal configuration of modular safety components for providing safety functions in an automation system which is composed of a number of modularly assembled system parts and comprises a decentralized safety controller. Such a decentralized safety controller consists, for example, of a number of safety input/output devices (I/O devices) and safe or failsafe controllers which preferably can also be operated with other non-failsafe devices on a common automation bus system.

In the case of modularly structured automation systems comprising a number of independent system parts or machines, a logically structured configuration of the decentralized safety functions is principally also required. For this, the safety functions are combined during their planning to form individual safety islands, wherein a respective island is assigned to a particular system part or a particular machine.

The safety functions of the safety island are provided from modular and decentralized safety controllers and safety I/O devices into which a safety component is loaded. All island-internal devices and devices across all islands can preferably be connected to a common linear bus line.

The controllers are in direct logic connection with their I/O devices which are subordinated with regard to addressing, wherein the communication in the entire network of an automation system or at least in a superordinated section is controlled by a communication master which also enables an exchange of safety-relevant data across all islands.

As is apparent from FIG. 1, the modular safety components are divided into address-independent logic modules and address-dependent parameter modules, wherein the parameter modules contain a respective island number, i.e., a respective address space of a safety controller and the associated I/O devices within a safety island.

In the logic modules, the safety logic of the controller and the channel assignment of controller and I/O devices of a safety island are defined. The logic modules of two islands can be combined to form one project if the safety logic and the channel assignment of the devices within both islands are exactly identical so that the only difference between the islands is their address.

With the automation system's standard controller in which the logic modules with the safety logic and the channel assignment as well as the parameter modules with the respective island address are stored, the two modules are combined to form valid safety components, and are backed up with safe, redundant information. With the standard controller, the safety components are transmitted via the network to the specifically addressed island.

Figure 2:
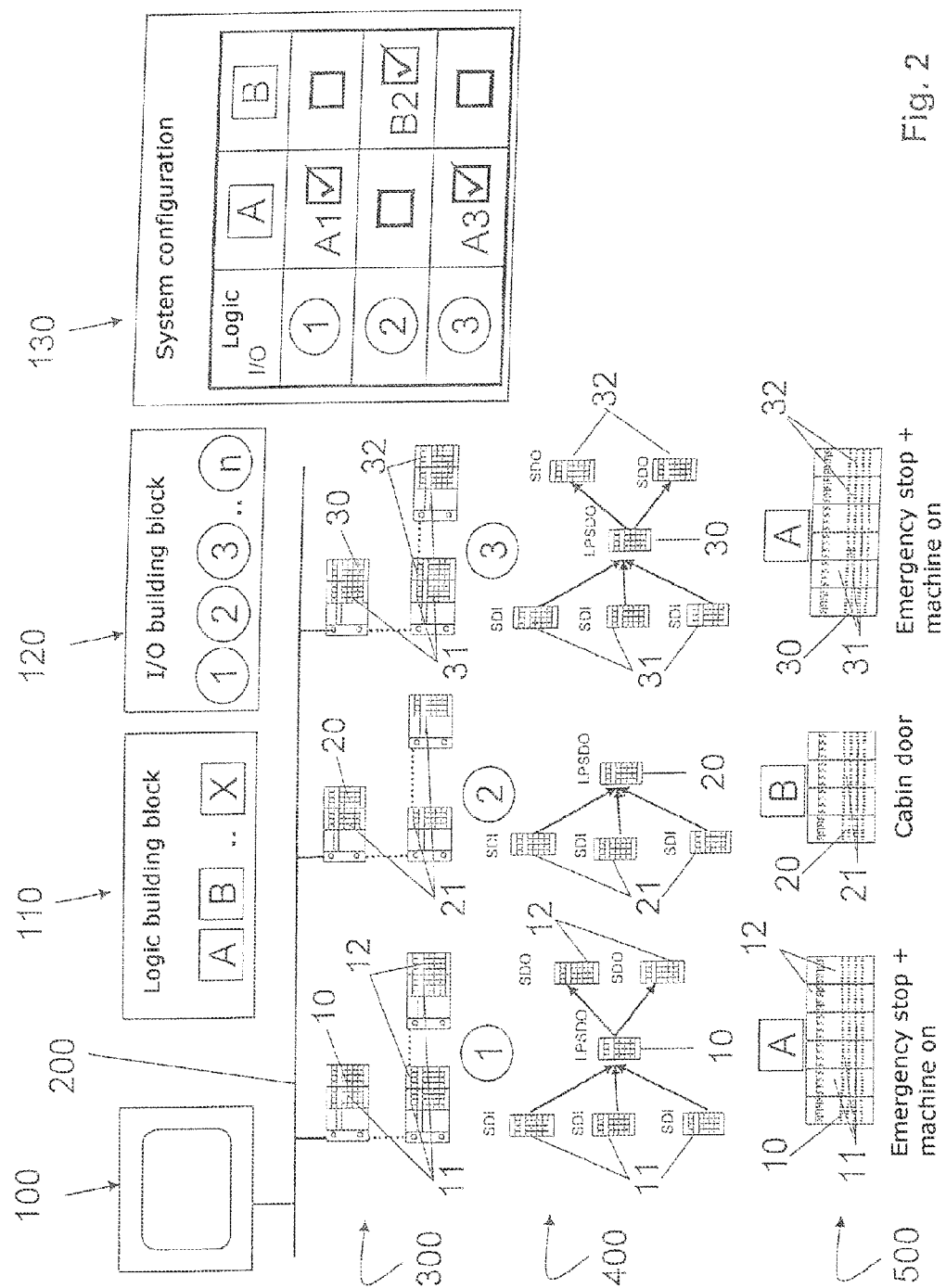
FIG. 2 shows the structure of modular safety components consisting of logic and parameter modules from previously validated combination possibilities.

By means of FIG. 2 it is illustrated how, for example, a PC or a PLC, different logic modules A, B, . . . X of a logic building block 110 with address-dependent parameter modules 1, 2, 3, . . . n of an I/O building block 130 can be handled within a standard controller 100. The combinations of logic and parameter modules A1, B2, and A3 previously validated with the safe computerized programming tool are comprised in the system configuration 130 which therefore contains the necessary recovery function for the valid combinations.

The logic modules A, B, . . . , X and the parameter modules 1, 2, 3, . . . , n are stored with the safety information as data sets in the standard controller 100. The standard controller is configured with a standard programming tool and is therefore put in the position to combine the stored logic modules with the parameter modules so as to form valid combinations. The combinations valid according to the system configuration 130 are backed up with the respective valid safety information, which is likewise stored in the standard controller, and are addressed and transmitted via the network 200 to the safety islands, wherein the addresses of the islands match a respective valid parameter module 1, 2, 3, . . . , n. The addresses of the safety devices, for example, are set during their installation by means of the hardware.

The safety islands 1, 2, 3, . . . , n include in each case a safety controller (LPSDO) 10, 20, 30 and a number of safety input devices (SDI) 11, 21, 31 and potentially a number of safety output devices (SDO) 12, 32.

The view 400 of the data flow shows the logic data flow within a safety island 1, 2, 3, . . . , n, wherein data are transmitted from the input devices (SDI) to the safety controllers (LPSDO) of a respective island. A respective LPSDO processes the received data and transmits control commands to the output devices (SDO) within an island. The safety controllers 10, 20, 30 can exchange safety information between each other and therefore provide a safety function across all islands.

It is apparent from view 500 of the devices that when configuring a safety island, only a compact and therefore clear safety control is displayed to the user in his/her safety programming tool. Therefore, the decentralized hardware structure and the associated data traffic on the network do not have to be considered during the configuration.

What is claimed is:

1. A method for the computerized provision of modular safety components for a plurality of uniquely addressable safety devices (10, 11, 12, 20, 21, 30, 31, 32) for achieving safety functions in a network (200) of an automation system, wherein said modular safety components comprise:
   i) an address-independent logic module (A, B, . . . , X), which can be used multiple times and/or for different devices with identical safety functions,
   ii) an address-dependent parameter module (1, 2, . . . n) being generated for one specific of said plurality of uniquely addressable safety devices, and
   iii) failsafe information including redundant information calculated via the address-independent logic module and the address-dependent parameter module, the method comprising:
   a) creating a plurality of safety components;
   b) storing a plurality of safety components, wherein the address-independent logic modules, the address-dependent parameter modules, and the failsafe information are stored individually, and wherein for each safety components, recovery information is stored;
   c) after connecting a safety device to the automation system, restoring and transmitting to the safety device the safety component created for the safety device by means of the recovery information from the associated logic and parameter modules as well as the associated failsafe information; and
   d) checking for accuracy of the transmitted safety component in the safety device by means of the associated failsafe information.

2. The method according to claim 1, wherein the logic and parameter modules as well as the failsafe information are stored in a non-safe storage.

3. The method according to claim 2, wherein the non-safe storage is provided by a non-safe standard controller of the automation system.

4. The method according to claim 3, wherein with the non-safe standard controller of the automation system, the stored recovery information for each of the safety devices is processed so that the logic and parameter modules as well as the failsafe information are retrieved from the storage and are in each case composed in a computerized manner to form the safety component of a respective safety device, and each safety component is addressed and transmitted to the respective specific safety device.

5. The method according to claim 4, wherein transmitting a safety component is requested by the respective safety device.

6. The method according to claim 1, wherein when storing a second and any further safety component, the associated logic modules are only stored if previously no identical logic module was stored.

7. An automation system, comprising a network (200) consisting of a plurality of uniquely addressable safety devices (10, 11, 12, 20, 21, 30, 31, 32) and a plurality of modular safety components,
   wherein the plurality of modular safety components corresponds to the plurality of the uniquely addressable safety devices, and
   wherein said modular safety components comprise:
   i) an address-independent logic module (A, B, . . . , X) which can be used multiple times and/or for different devices with identical safety functions,
   ii) an address-dependent parameter module (1, 2, . . . , n) being generated for one specific of said plurality of uniquely addressable safety devices, and
   iii) failsafe information including redundant information calculated via the address-independent logic module and the address-dependent parameter module, and
   wherein the address-independent logic modules, the address-dependent parameter modules as well as the failsafe information of the respective safety components are stored individually, together with recovery information in a storage in such a manner that after connecting a safety device, a safety component created for this respective safety device can be restored by means of the recovery information from the associated logic and parameter modules as well as the associated failsafe information from the storage and can be transmitted to the safety device, and the accuracy of the transmitted modular safety component in the safety device can be checked by means of the associated failsafe information.

8. The automation system according to claim 7, wherein the storage is a non-safe storage.

9. The automation system according to claim 8, wherein the non-safe storage is comprised by a non-safe standard controller (100).

10. The automation system according to claim 9, wherein the non-safe standard controller is configured so as to process the stored recovery information and to retrieve the logic and parameter modules as well as the failsafe information from its storage, and to compose for each safety device in each case one safety component and to transmit each of the safety components addressed to the respective specific safety device.

11. The automation system according to claim 10, wherein the respective specific safety device is configured so as to request the transmission of a safety component.

12. The automation system according to claim 7, wherein from a plurality of identical logic modules, in each case only one module is stored in the storage.

13. The automation system according to claim 7, wherein the failsafe information calculated via the address-independent logic module and the address-dependent parameter module ensures that only combinations of said modules validated with a failsafe programming tool are accepted by the safety device.

* * * * *